United States Patent [19]

Morokuma et al.

[11] 4,106,173

[45] Aug. 15, 1978

[54] METHOD OF MANUFACTURING MAGNETIC HEADS

[75] Inventors: Tadashi Morokuma, Tokyo; Naotsune Tsuda, Hachioji, both of Japan

[73] Assignee: Olympus Optical Co., Ltd., Tokyo, Japan

[21] Appl. No.: 692,671

[22] Filed: Jun. 4, 1976

[30] Foreign Application Priority Data

Jun. 13, 1975 [JP] Japan ................................ 50-71782
Jul. 30, 1975 [JP] Japan ................................ 50-92736
Nov. 10, 1975 [JP] Japan ............................... 50-135540

[51] Int. Cl.² ........................................ G11B 5/42
[52] U.S. Cl. ............................ 29/603; 360/119; 360/127
[58] Field of Search .............. 29/603; 360/119–121, 360/125, 127; 65/43, 58

[56] References Cited

U.S. PATENT DOCUMENTS

| | | | |
|---|---|---|---|
| 3,104,455 | 9/1963 | Frost | 29/603 |
| 3,333,332 | 8/1967 | Vrolijks et al. | 29/603 |
| 3,375,575 | 4/1968 | Visser et al. | 29/603 |
| 3,751,803 | 8/1973 | Fisher et al. | 29/603 |
| 3,819,348 | 6/1974 | Murray | 29/603 X |
| 3,943,624 | 3/1976 | Wank | 29/603 |
| 4,040,174 | 8/1977 | Tsuda | 29/603 |

*Primary Examiner*—Carl E. Hall
*Attorney, Agent, or Firm*—Ostrolenk, Faber, Gerb & Soffen

[57] ABSTRACT

A method of manufacturing a magnetic head comprises the steps of providing a pair of core block pieces each having an abutting area and a gap defining surface which is slightly recessed relative to the abutting area, disposing the pair of core block pieces in a manner such that the gap defining surfaces are located opposite to each other and the abutting areas are held in abutment against each other, thereby defining a gap between the gap defining surfaces, placing a quantity of a gap forming material such as glass, ceramic, enamel or the like within or adjacent to the gap, heating the gap forming material to cause it to melt, cooling the core block pieces, upon completion of permeation of the gap forming material into the respective gaps, to solidify such material, thereby providing a core block, cutting and-/or slicing the core block into cores of a given size, winding a coil on the individual cores, and fixedly mounting each of the cores with the coil thereon in a housing to provide a magnetic head. In the magnetic head thus formed, the gap in the core is defined by the air of gap defining surfaces, at least one of which is bevelled. A desired gap length is obtained by cutting the core at an optimum position along the length of the gap defining surfaces or along a suitable cutting plane as defined herein.

10 Claims, 64 Drawing Figures

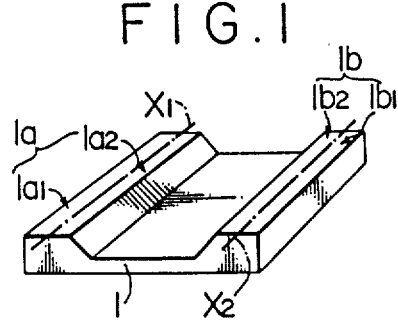
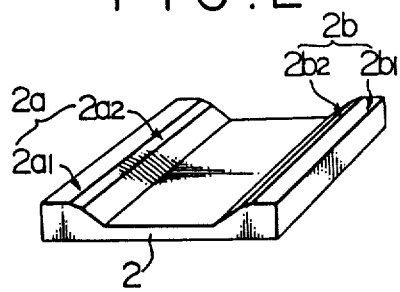
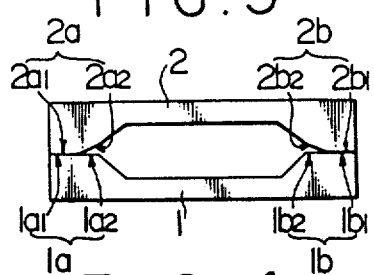
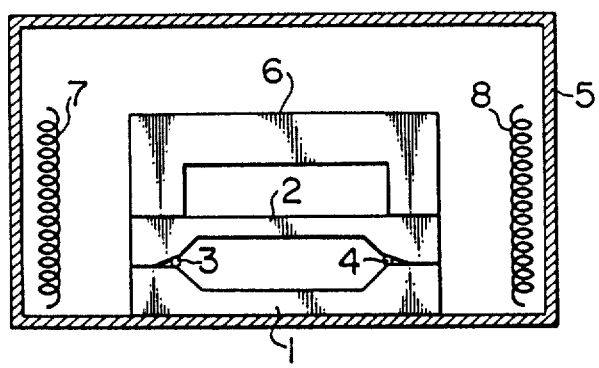

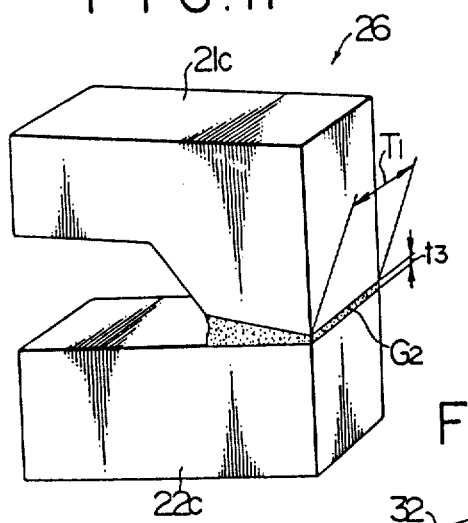
FIG. 17
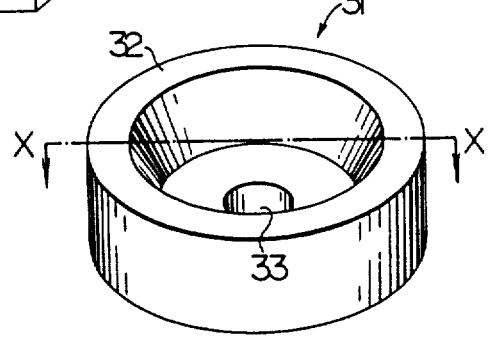
FIG. 19
FIG. 18
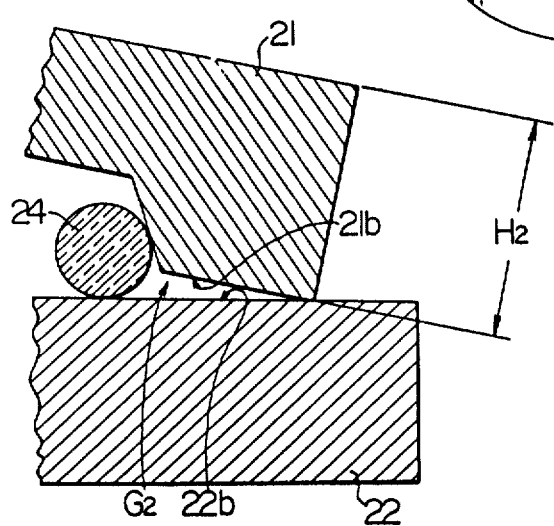

F I G. 30
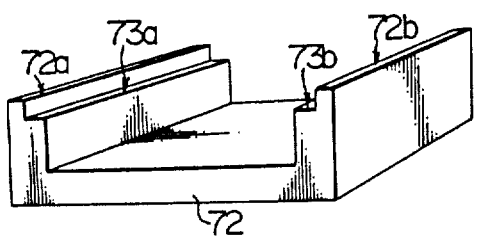
F I G. 31
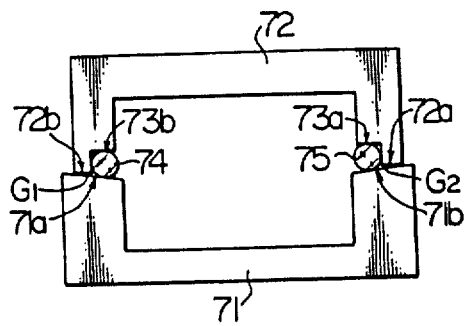
F I G. 34
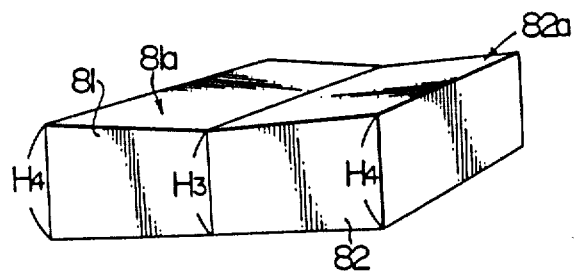

F I G. 32
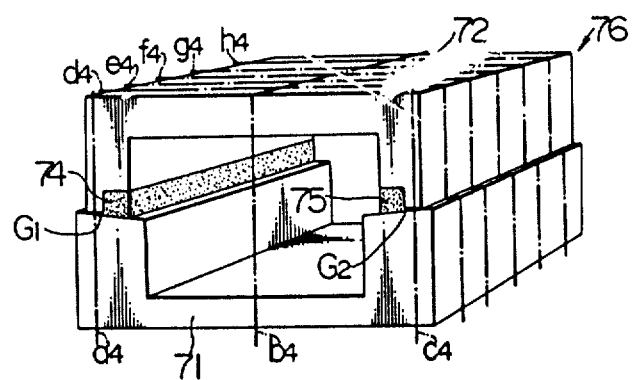
F I G. 33
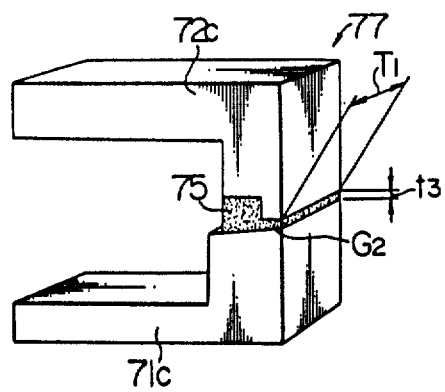

F I G. 53
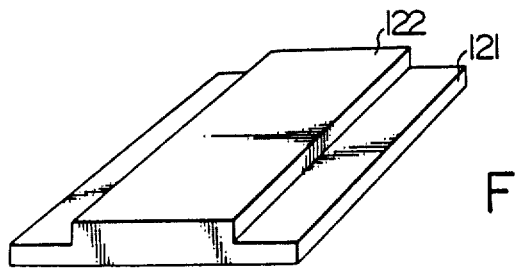
F I G. 54
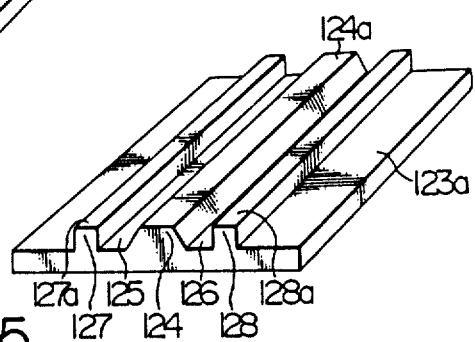
F I G. 55
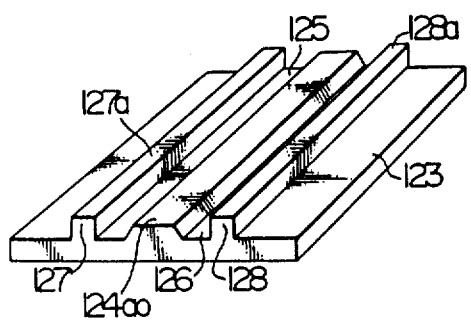
F I G. 56
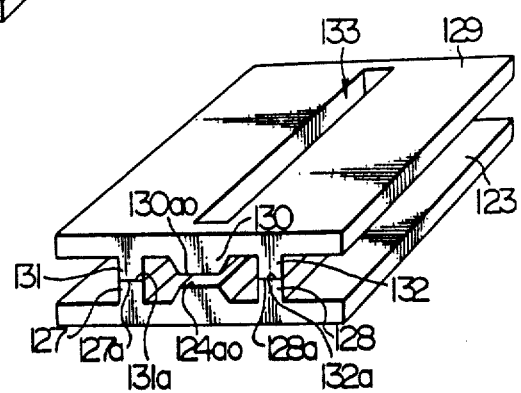

METHOD OF MANUFACTURING MAGNETIC HEADS

BACKGROUND OF THE INVENTION

The invention relates to a magnetic head and a method of manufacturing same.

It is known to manufacture a magnetic head by placing a pair of core pieces, which comprise an oxide ferromagnetic material, in abutting relationship with a spacer of a metal foil or mica interposed therebetween to define a gap length between the respective gap defining surfaces of the core pieces, and causing a fluidized gap forming material such as glass or enamel to permeate into the remainder of the gap and to solidify therein subsequently. However, the use of the spacer involves a difficulty in achieving a high accuracy particularly when the gap length is on the order of 1.5 to 2.0 microns. In addition, the spacer itself is expensive, resulting in an increased manufacturing cost.

SUMMARY OF THE INVENTION

It is an object of the invention to provide a magnetic head of a high accuracy in an inexpensive manner while avoiding the use of the spacer by utilizing a pair of core block pieces, at least one of which is formed with a bevelled or tapered gap defining surface, or which are provided with abutting areas.

In the method of manufacturing a magnetic head according to the invention, at least one of the core block pieces is formed with a bevelled gap defining surface. Alternatively, the core block pieces are provided with abutting areas for forming a gap. This dispenses with the need for a spacer, enabling a core having a high accuracy gap to be obtained inexpensively even if the gap is of a reduced length. In the manufacture of the magnetic head according to the invention, the bevelled gap defining surface on at least one of the core block pieces permits a desired gap length to be easily achieved with a high degree of precision by cutting the core blocks or cores at an optimum position along the length of the gap defining surfaces when or before the core block is finally formed.

BRIEF DESCRIPTION OF THE DRAWINGS

FIGS. 1 and 2 are perspective views of one of core block pieces used in the present invention;

FIG. 3 is a front view of a pair of core block pieces disposed in abutting relationship;

FIG. 4 is a front view, partially in cross section, of a heating furnace in which the pair of core block pieces are disposed;

FIGS. 14 to 17 are perspective views of a pair of core block pieces, illustrating a series of steps involved in the manufacturing of the core according to the invention;

FIG. 18 is a fragmentary cross section of a pair of core block pieces, illustrating the manner of forming a gap;

FIG. 19 is a perspective view of a cylindrical core block piece as used in the present invention;

FIGS. 29 and 30 are perspective views of core block pieces which form a pair;

FIG. 31 is an assembled front view of a pair of core block pieces;

FIGS. 32 and 33 are perspective views of a finished core block and a core which is sliced therefrom;

FIGS. 34 to 37 are perspective views of a pair of core block pieces which illustrate different manufacturing steps applied according to the invention;

FIGS. 39 and 40 are perspective views of a finished core block and a core which is sliced therefrom, respectively;

FIGS. 53 to 56 are perspective views of a pair of core block pieces, illustrating a series of manufacturing steps applied according to the invention;

DETAILED DESCRIPTION OF PREFERRED EMBODIMENTS

Figure 5:
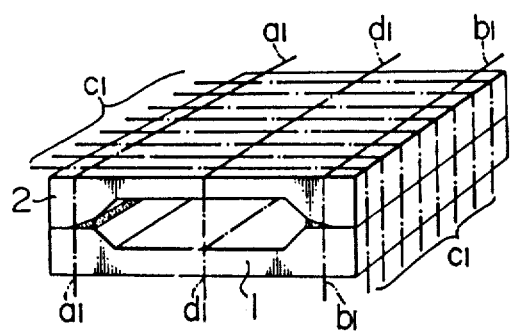
FIG. 5 is a perspective view of a resulting core block.

Referring to FIGS. 1 and 2, there is shown a pair of core block pieces 1, 2 which comprise a sintered oxide ferromagnetic material, and which are used to form the magnetic head according to the invention. Adjacent to its opposite sides, each of the core block pieces 1, 2 is provided with elongate magnetic path surfaces 1a, 2a, 1b, 2b which projects from the plane of the respective core block pieces. Each of the magnetic path surfaces 1a, 2a, 1b, and 2b are respectively comprised of an abutting area 1a1, 2a1, 1b1, 2b1 and a gap defining surface 1a2, 2a2, 1b2, 2b2. The gap defining surfaces 1a2, 1b2 are horizontal while the gap defining surfaces 2a2, 2b2 are gently bevelled. With respect to the core block piece 1 shown in FIG. 1, the abutting areas 1a1, 1b1 on the magnetic path surface 1a, 1b as well as the gap defining surfaces 1a2, 1b2 lie on a common plane and their boundary is indicated by phantom lines $X_1$, $X_2$. With respect to the other core block piece 2 shown in FIG. 2, the gap defining surfaces 2a2, 2b2 form an angle with respect to the abutting areas 2a1, 2b1 on the magnetic path surfaces 2a, 2b, the angle being on the order of 0°.30' to 6°.00'. The corresponding magnetic path surfaces 1a, 2a, 1b, 2b of the core block pieces 1, 2 are worked (i.e. polished) to a mirror finish, and they are disposed in opposing relationship as illustrated in FIG. 3.

The spaces formed between the gap defining surfaces 1a2, 2a2 and the gap defining surfaces 1b2, 2b2 of the core block pieces 1, 2 are partially filled with a non-magnetic gap forming material 3, 4 having a melting point on the order of 900° C and which may comprise glass, ceramic or enamel in a particulate, strip, rod or other various forms (see FIG. 4). The assembly is received in a furnace chamber 5, and is stabilized by placing a weight 6 thereon. The chamber is filled with inactive gas such as nitrogen, and the assembly is heated to the melting point of the gap forming material 3, 4 by means of a pair of heaters 7, 8 located on the opposite sides thereof and represented by coils. As the gap forming material 3, 4 melts, it permeates into the space formed between the gap defining surfaces 1a2, 2a2 and between the gap defining surfaces 1b2, 2b2 of the core block pieces 1, 2. The chamber 5 is then allowed to cool down gradually, whereby the gap forming material is solidified between the respective gap defining surfaces to bond the core block pieces 1, 2 together.

Figure 6:
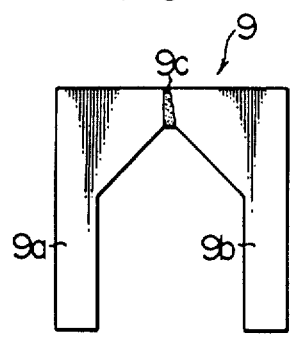
FIG. 6 is a plan view of a core which is obtained in accordance with the invention.

The bonded core block pieces 1, 2 are removed from the chamber 5 and the assembly is cut along a pair of phantom lines $a_1$—$a_1$, $b_1$—$b_1$ to remove unnecessary portions from the opposite lateral sides. Subsequently, the resulting core block is sliced to a given thickness along a number of planes indicated by phantom lines $c_1$—$c_1$, and then cut along a phantom line $d_1$—$d_1$ as required, thereby producing a multitude of cores having a pair of gaps (not shown) or cores 9 each having a single gap as shown in FIG. 6. In the description to follow, the planes such as indicated by phantom lines $a_1$—$a_1$, $b_1$—$b_1$ will be referred to as a cutting plane, and the planes such as indicated by phantom $c_1$—$c_1$ will be referred to as a slicing plane. In FIG. 6, it will be noted that the core 9 comprises a pair of core pieces 9a, 9b and a gap 9c. By suitably changing the position of the lines $a_1$—$a_1$ and $b_1$—$b_1$, any desired gap length may be obtained as permitted by the varying clearance between the gap defining surfaces 2a2, 2b2 and their corresponding surfaces 1a2, 1b2.

Figure 7:
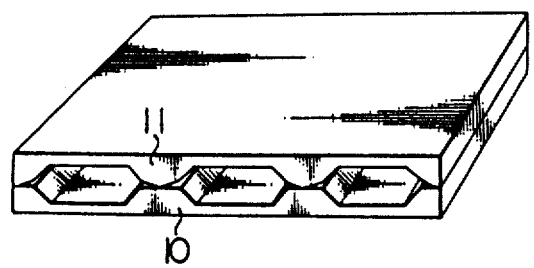
FIGS. 7 and 8 are perspective views illustrating different combinations of core block pieces.

FIG. 7 shows a pair of core block pieces 10, 11 which are formed with a plurality of gap defining surfaces and which are disposed in abutting relationship. The use of such core block pieces enables an increased number of cores or core chips to be obtained simultaneously.

Figure 8:
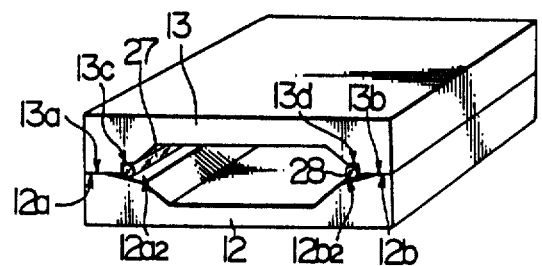
Figure 9:
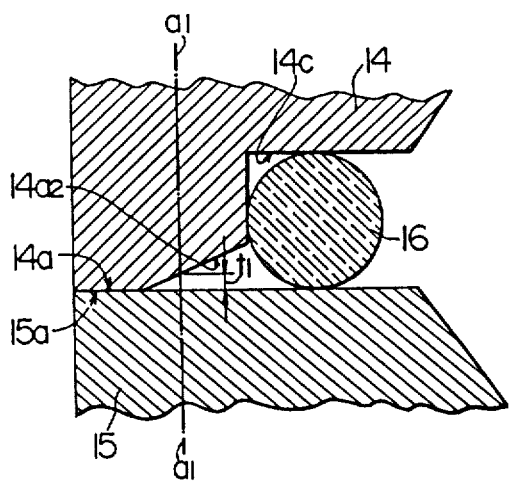
FIGS. 9 and 10 are fragmentary cross sections of a pair of core block pieces, illustrating one example of the configuration of the gap defining surfaces.

FIG. 8 shows an arrangement which facilitates the placement of the gap forming material where the angle of inclination of the gap defining surfaces is small, by providing a step therein. Specifically, one core block piece 12 is formed with a pair of magnetic surfaces 12a, 12b, each of which includes a gap defining surface 12a2, 12b2, respectively, having a small angle of inclination relative to the surfaces 12a, 12b. The other core block piece 13 comprises a pair of flat gap defining surfaces 13a, 13b which are followed by steps 13c, 13d, respectively. When the core block pieces 12, 13 are disposed in abutting relationship against each other, a gap forming material 27, 28 is fitted or inserted into the spaces created by the steps 13c, 13d. It is to be noted that the steps may be formed in either core block piece. FIG. 9 shows an alternate arrangement in which a step 14c is formed in a core block piece 14 which is formed with a bevelled gap defining surface 14a2. In this instance, when the core block piece 14 having a magnetic path surface 14a which includes the bevelled gap defining surface 14a2 is disposed in abutting relationship with the other core block piece 15 having a flat gap defining surface 15a, a gap forming material 16 is fitted into the space defined by the step 14c and is retained thereby.

Figure 10:
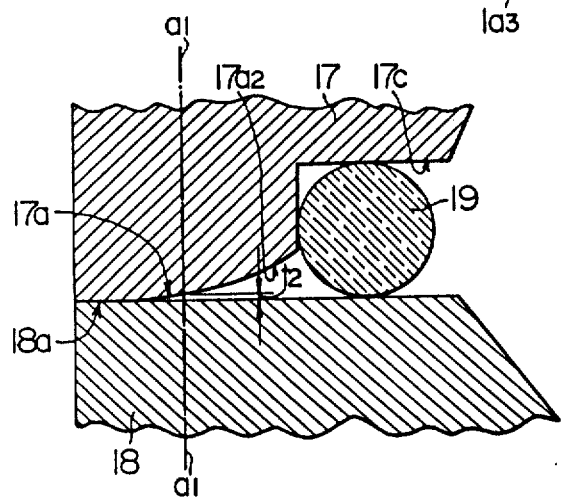

FIG. 10 shows a different arrangement in which a core block piece 17 having a magnetic path surface 17a which includes a curved gap defining surface 17a2 is disposed in abutting relationship with a core block piece 18 which has a flat gap defining surface 18a, with a gap forming material 19 disposed within the space defined by a step 17c formed in the core block piece 17. When the gap defining surface is formed by a curved surface, it will be appreciated that the gap length $t_2$ achieved in the arrangement of FIG. 10 will be substantially reduced as compared with the gap length $t_1$ obtained in the arrangement of FIG. 9 when the core blocks of these Figures are cut along the same plane $a_1$—$a_1$.

A practical head has been constructed according to the embodiment shown in FIGS. 1 to 5. The abutting areas 1a1, 2a1, 1b1, 2b1 of the both core block pieces 1, 2 had a width of 1 mm, the gap defining surfaces 1a2, 2a2, 1b2, 2b2 had a width of 1 mm and the gap length was chosen to be 1 ± 0.1 micron. With these parameters, it was found that a variation in the angle of inclination of the gap defining surfaces 2a2, 2b2 may be tolerated in a range from 0°.31' to 0°.38', demonstrating the fact that a magnetic head of the desired quality can be easily formed according to the invention. However, it should be noted that at least one of the core block pieces may have a bevelled surface over its entire magnetic path surface. In this instance, the magnetic path surface will be in abutment against the mating core block piece along its marginal edge, which substantially exists as a simple edge line.

Figure 11:
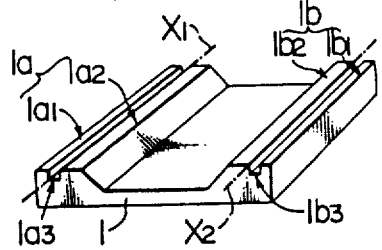
FIG. 11 is a perspective view of a different example of a core block piece.
Figure 12:
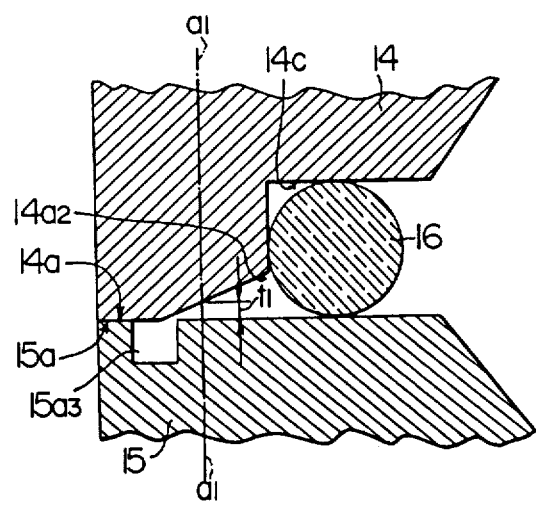
FIGS. 12 and 13 are fragmentary cross sections of a pair of core block pieces, illustrating a different configuration of the gap defining surfaces.
Figure 13:
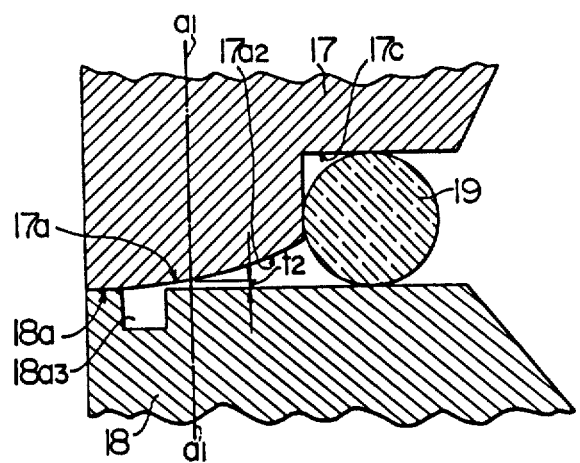

FIG. 11 shows a modification in which the lower core block piece 1 (see FIG. 1) is provided with a pair of lengthwise extending grooves 1a3, 1b3 which are formed in the abutting areas 1a1, 1b1, respectively. The provision of such grooves permits the gap forming material 3, 4 to be drawn into the grooves 1a3, 1b3 as it becomes molten upon heating, thereby greatly facilitating the permeation of such material into the space between the gap defining surfaces $1a2, 2a2, 1b2, 2b2$. For the arrangements shown in FIGS. 9 and 10, grooves $15a3, 18a3$ may be formed in the respective core block pieces 15, 18, as illustrated in FIGS. 12 and 13.

Figure 14:
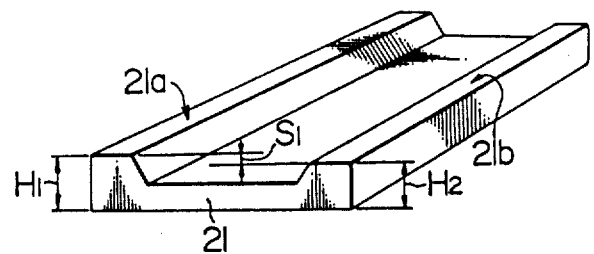

FIGS. 14 to 18 show another embodiment of the invention. In this embodiment, one of the core block pieces of the pair is provided with gap defining surfaces which are at different elevations so that when the core block piece is placed on a horizontal surface with the gap defining surfaces facing downward, the core block piece assumes an inclined position to cause the gap defining surfaces to be slanted. Referring to FIG. 14, there is shown a core block piece 21 which is provided with a pair of gap defining surfaces $21a, 21b$ along its opposite sides, these surfaces being at differential elevations. In the arrangement shown, the height $H_1$ of the left-hand gap defining surface $21a$ is greater than the height $H_2$ of the right-hand gap defining surface $21b$, and the difference between these heights is equal to $S_1$. These gap defining surfaces $21a, 21b$ may be obtained by initially polishing both surfaces to the same level by optical means, and then continuing the optical polishing operation on the gap defining surface $21b$, for example.

Figure 15:
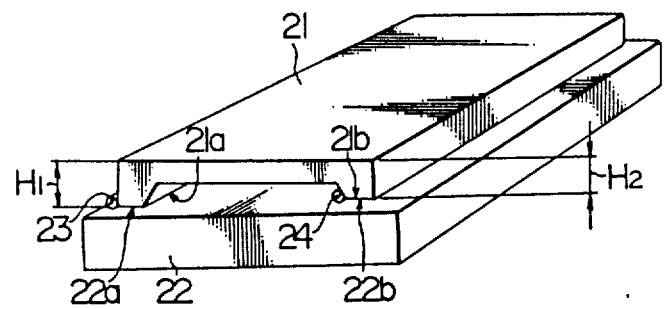
Figure 16:
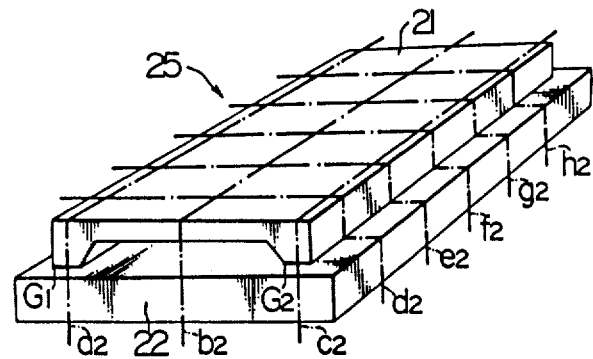

The core block piece 21 is then disposed on a core block piece 22 which is in the form of the flat plate, so that the gap defining surfaces $21a, 21b$ of the core block piece 21 are located opposite to gap defining surfaces $22a, 22b$ of the core block piece 22, as shown in FIG. 15. As will be described later with reference to FIG. 18, the presence of the elevation difference $S_1$ between the gap defining surfaces $21a, 21b$ creates wedge-shaped clearances $G_1, G_2$ which are in the form of a triangle. As will be appreciated, the core block piece 22 may have bevelled or curved surfaces for defining the gap. As shown in FIG. 15, a pair of round rods 23, 24 of a glass are placed adjacent to the clearances $G_1, G_2$, and a suitable weight (not shown) may be placed on top of the upper core block piece 21 and the assembly placed within a furnace chamber filled with an atmosphere of an inactive gas generally in the same manner as shown in FIG. 6. When it is heated to a temperature above the melting point of glass, the rods 3, 4 become molten to permeate into the clearance regions $G_1, G_2$. After the permeation of the glass, the assembly is removed from the chamber and is allowed to cool down in the air, whereupon the glass becomes solidified, producing a core block 25 as shown in FIG. 16. The resulting core block 25 may be cut along planes indicated by phantom lines $a_2, b_2$ and $c_2$, and then sliced along planes indicated by phantom lines $d_2, e_2, f_2, g_2$ and $h_2$, thereby providing a plurality of cores, one of which is shown at 26 in FIG. 17. The core 26 comprises a pair of core pieces $21c, 22c$ and the gap $G_3$ having a gap length $l_3$ which is determined by the position of the phantom lines $a_2$ and $c_2$. The track width $T_1$ is determined by the choice of the spacing between the phantom lines $d_2$ to $h_2$. The phantom line $b_2$ indicates the cutting line when cores having a single gap are to be produced, but the core block need not be cut along this phantom line when it is desired to produce cores having a pair of spaced gaps.

In the arrangement described, the glass which is utilized as the gap forming material need not be in the form of round rods, but may be in powder, particle or other form. In addition, the glass may be replaced by other materials such as ceramic or enamel as desired.

Figure 20:
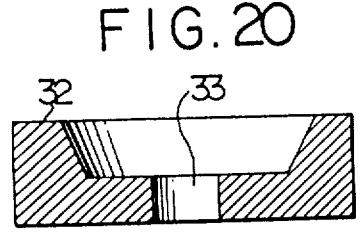
FIGS. 20 to 22 are cross sections of the cylindrical core block piece, illustrating a series of manufacturing steps which are supplied thereto in accordance with the invention.

FIGS. 19 to 28 show other embodiments of the invention which employ a cylindrical core block. Referring to FIGS. 19 and 20, there is shown a cylindrical core block piece 31 which is centrally recessed. The bottom surface of the recess is centrally formed with an aperture 33 extending therethrough, which facilitates the support or handling thereof during the manufacturing of the core block according to the invention.

Figure 21:
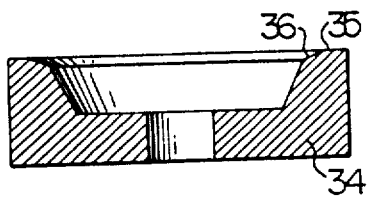
Figure 22:
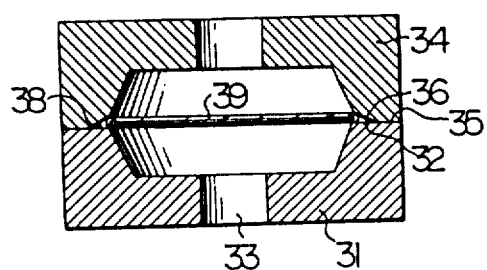

The upper end face of the core block piece 31 is formed as a gap defining surface 32. As shown in FIG. 21, there is provided another core block piece 34 which is generally similar in configuration to the core block piece 31 except that an inwardly gently bevelled surface 36 is formed on its top surface, leaving a peripheral region 35 on the gap defining surface thereof. The peripheral region 35 serves as an abutment when it is disposed in abutting relationship with the other core block piece. The individual core block pieces 31 and 34 have their gap defining surfaces subjected to a mirror finish, and they are disposed in overlying and abutting relationship as shown in FIG. 22. In this manner, the core block pieces abut against each other around the peripheral region of the respective gap defining surfaces, and an annular clearance region 38 which is wedge-shaped in cross section is formed by the bevelled surface 36 at a position inwardly of the peripheral region.

Figure 23:
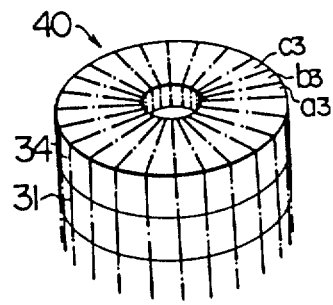
FIG. 23 is a perspective view of the finished cylindrical core block.
Figure 24:
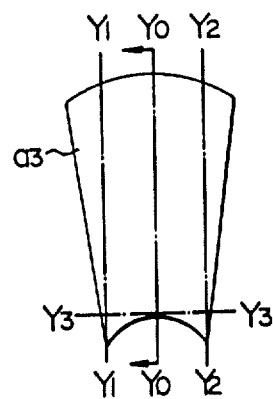
FIG. 24 is a plan view of a blank core.
Figure 25:
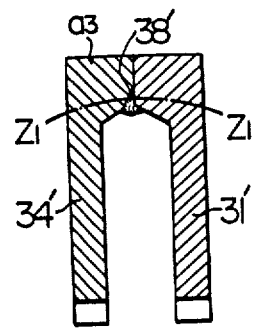
FIG. 25 is a longitudinal section of the core.

Glass fibres 39 are disposed in the annular clearance 38 and the assembly may be disposed in a furnace chamber (not shown) which is constructed in a manner similar to that shown in FIG. 4 to be heated to the melting point of the glass. Thereupon the glass fibres become molten to permeate into and fill the clearance 38. Then the assembly is allowed to cool down within the chamber, thus permitting the molten glass which fills the clearance 38 to be solidified to bond the core block pieces 31, 34 together. The bonding effect may be improved by placing a weight on top of the upper core block piece 34. The resulting core block 40 which comprises the bonded core block pieces 31, 34 is removed from the chamber and may be cut along a plurality of planes including the axis of the core block 40, as shown in FIG. 23, thereby producing a multitude of core pieces $a_3, b_3, c_3 \ldots$ One of the core pieces, $a_3$, obtained in this manner is shown in top plan view in FIG. 24 and in side elevation in FIG. 25. The core piece $a_3$ comprises a portion of the core block pieces 31, 34, which are indicated by numerals 31', 34', and a portion of the clearance 38 region which is indicated by numeral 38'. The core piece $a_3$ may be cut along phantom lines $Y_1$—$Y_1$, $Y_2$—$Y_2$ and $Y_3$—$Y_3$ shown in FIG. 24, and after polishing, it may be cut along a phantom line $Z_1$—$Z_1$ shown in FIG. 25, thereby providing a finished core for a magnetic head. A desired gap length may be obtained in the core by a suitable choice of the position of the phantom line $Z_1$—$Z_1$ as permitted by the degree of inclination of the bevelled surface 36. The angle of inclination of the bevelled surface 36 is very small, generally on the order of a few degrees or less.

Figure 26:
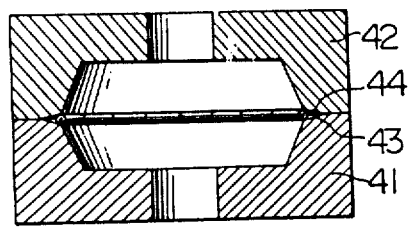
FIGS. 26 to 28 are cross sections of several pairs of core block pieces.

FIG. 26 shows an arrangement in which a pair of upper and lower core block pieces 41, 42 are provided with bevelled surfaces 43, 44 which are asymmetrical with respect to each other. With this arrangement, when the position of the cutting line $Z_1$—$Z_1$ is changed to form a desired gap, the wedge-shaped configuration of the gap remains symmetrical with respect to its centerline, as in the arrangement of FIG. 25.

Figure 27:
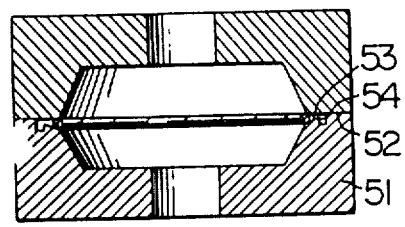

In FIG. 27, one of the cylindrical core block pieces has its gap defining surface 52 formed with a circular groove 54. Specifically, the circular groove 54 is formed along the boundary between the horizontal portion of the gap defining surface 52 and the bevelled surface 53 of the lower core block piece 51. This disposition facilitates the placement of glass in powder or pellet form into the clearance, and also provides a spillage space for the molten glass, thus assisting in the permeation thereof into the clearance region. It is understood that the both upper and lower core pieces may be symmetrically formed with such grooves.

Figure 28:
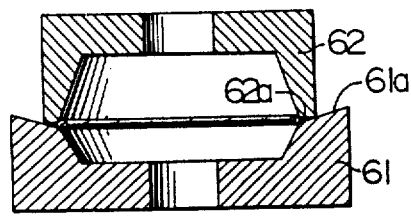

FIG. 28 shows a combination of a pair of upper and lower cylindrical core block pieces which have different diameters. Specifically, a lower core block piece 61 has a diameter which is greater than that of an upper core block piece 62, and has a gap defining surface 61a which is entirely formed as a bevelled surface. This facilitates the disposition of corresponding portions of the gap defining surfaces 61a, 62a in abutting relationship and in tight engagement. Preferably a weight is placed on top of the upper core block piece 62 to stabilize the axes of the both core block pieces 61, 62 in alignment with each other.

Figure 29:
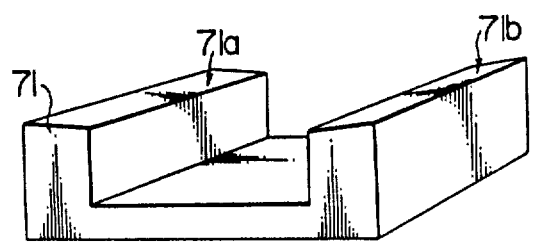

FIGS. 29 to 33 show an embodiment of the invention in which both gap defining surfaces of a lower core block piece 71 are formed as bevelled surfaces. Referring to FIG. 29, the gap defining surfaces 71a, 71b of the core block pieces 71 are bevelled in a manner such that the outside edge is at a higher elevation than the inside. On the other hand, the other core block piece 72 is formed with a pair of horizontal gap defining surfaces 72a, 72b, as shown in FIG. 30. A pair of steps 73a, 73b are formed inside the gap defining surfaces 72a, 72b of the core block piece 72, and facilitate the placement of gap forming materials 74, 75 (see FIG. 31) therein. It should be understood that these steps may be replaced by elongate grooves or may be omitted in certain circumstances.

The core block pieces 71, 72 are disposed in abutting relationship as illustrated in FIG. 31, and the gap forming materials 74, 75 such as glass rods are inserted into the space defined by the steps 73a, 73b. Subsequently, an arrangement similar to that shown in FIG. 4 is employed to heat the assembly. The heating causes the gap forming materials 74, 75 to melt, and after they have permeated into gaps $G_1$, $G_2$, the assembly is allowed to cool down, thereby providing a core block 76 shown in FIG. 32 which comprises the bonded core block pieces. If required, a resin molding may be applied to the assembly.

By cutting the core block 76 along planes indicated by phantom lines $a_4$, $b_4$ and $c_4$, and slicing it along planes indicated by phantom lines $d_4$, $e_4$, $f_4$, $g_4$ and $h_4$, as shown in FIG. 32, there is obtained a plurality of cores such as shown at 77 in FIG. 33. The core 77 comprises a pair of core pieces 72c, 71c and includes a gap $G_2$. The gap $G_2$ has a length $t_1$ which can be chosen to a desired value by suitably selecting the location of the phantom lines $a_4$ and $c_4$. A track width $T_1$ can be arbitrarily determined by suitably choosing the location of phantom lines $t_4$ to $h_4$. If the assembly shown in FIG. 32 is only cut along planes indicated by the phantom lines $a_4$ and $c_4$, then after slicing, there is obtained a plurality of cores, each of which is provided with a pair of spaced gaps.

Figure 35:
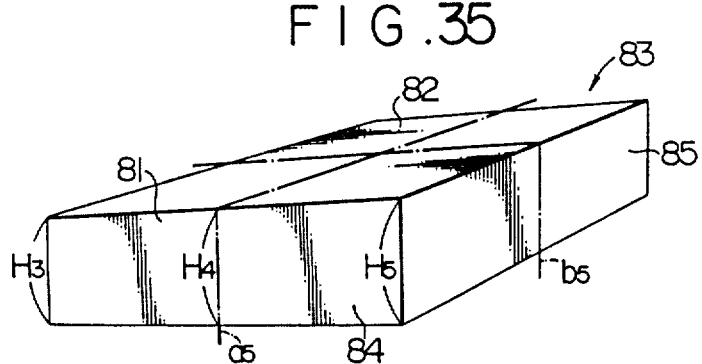
Figure 36:
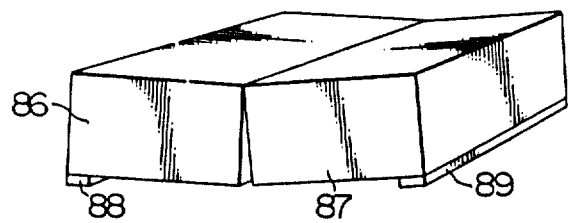

FIGS. 34 to 40 show another embodiment of the invention in which the entire upper surface of the lower core block piece is inclined or bevelled in a manner such that the outer regions are at higher elevations than the central region. Referring to FIG. 34, a pair of lower core block pieces 81, 82 each having a height of $H_3$ at its one lateral edge and a height of $H_4$ at the opposite lateral edge, $H_3$ being less than $H_4$, are disposed in laterally abutting relationship at their lateral edges having the reduced height. These pieces 81, 82 have an inclined upper surface 81a, 82a, respectively. These core block pieces 81, 82 can be obtained by dividing a larger block 83 of core material which has an inclined upper surface, as shown in FIG. 35, into four sections. Specifically, the block 83 has a height of $H_3$ at one lateral edge, a height of $H_4$ at its center, and a height of $H_5$ at its opposite lateral edge which is dimensioned such that $H_5 = 2H_4 - H_3$. The block is cut along planes indicated by phantom lines $a_5$, $b_5$. The remaining sections 84, 85 of the block 83 have a similarly inclined upper surface, and therefore can be used for a similar purpose. Alternatively, the core block pieces 81, 82 may be formed by a pair of rectangular core blocks 86, 87 disposed in juxtaposition, with a pair of foot members 88, 89 attached to the bottom of the respective core blocks as by evaporation, adhesion or mechanical fitting, along their edges which are remote from each other, as shown in FIG. 36.

Figure 37:
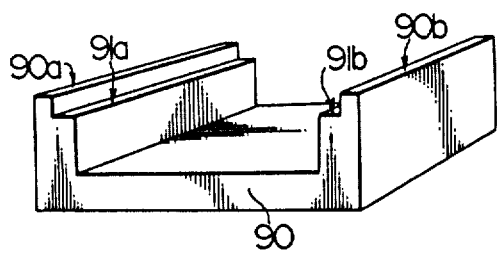
Figure 38:
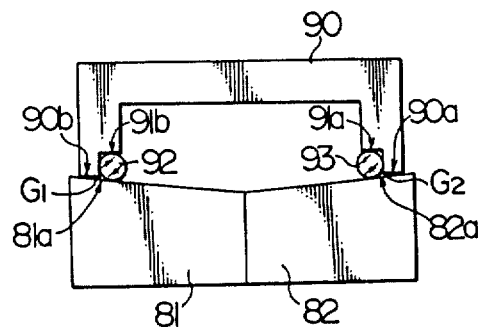
FIG. 38 is a front view of a pair of mating core block pieces.

A core block piece 90 of an oxide ferromagnetic material is adapted to be disposed on top of the lower core block pieces 81, 82, as illustrated in FIG. 38. FIG. 37 shows that the core block piece 90 has a pair of gap defining surfaces 90a, 90b projecting from its opposite sides, and a pair of steps 91a, 91b formed inside these gap defining surfaces for facilitating the placement of a gap forming material therein. However, it should be noted that the provision of such steps is not essential, but that they may be replaced by elongate grooves formed in the respective gap defining surfaces.

Figure 39:
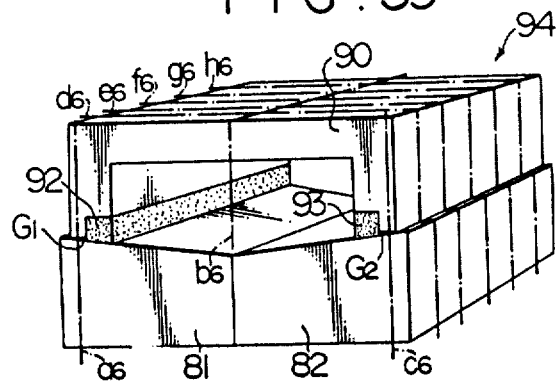

When the core block piece 90 is disposed on top of the core block pieces 81, 82 as shown in FIG. 38, a pair of round glass rods 92, 93 are disposed in the spaces defined by the gap defining surfaces 81a, 82a and the steps 91a, 91b, and are then heated to a temperature above the softening point of the glass in a furnace chamber (not shown) which is filled with an inactive gas, generally in a manner similar as to that illustrated in FIG. 4. The melting of the glass causes it to permeate into gaps $G_1$, $G_2$ defined between the opposing gap defining surfaces. Thereafter, the assembly is allowed to cool down to bond all of the core block pieces together, thereby providing a core block 94 as shown in FIG. 39. If required, a resin molding may be applied to the assembly.

By cutting the core block 94 obtained in this manner along planes indicated by phantom lines $a_6$, $b_6$ and $c_6$, and slicing it along planes indicated by phantom lines $d_6$, $e_6$, $f_6$, $g_6$ and $h_6$, all of which are shown in FIG. 39, there is obtained a plurality of cores 95 shown in FIG. 40, each of which comprises a pair of core pieces 90c, 82b and includes a gap $G_2$. The gap $G_2$ has a length $t_3$ which may be chosen as desired by selecting an optimum position for the planes indicated by phantom lines $a_6$ and $c_6$. The track width $T_1$ can also be chosen by arbitrarily selecting the location of the phantom lines $d_6$ to $h_6$. It will be noted that when the core block 94 is not cut along the plane indicated by the phantom line $b_6$, there is obtained cores each having a pair of spaced gaps.

Figure 41:
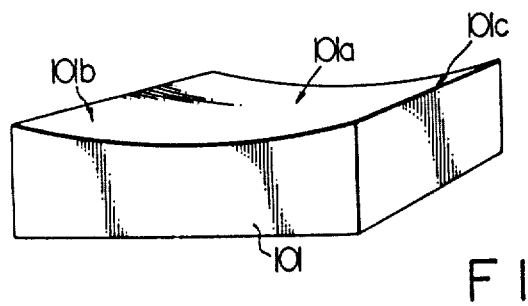
FIGS. 41 to 43 are perspective views of different examples of one of the core block pieces which form a pair.
Figure 42:
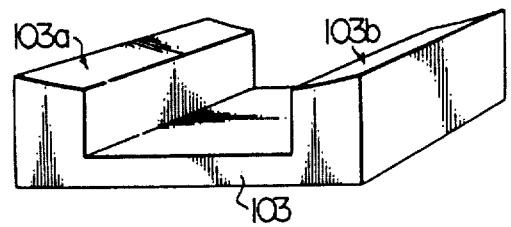

FIGS. 41 to 46 show a further embodiment of the invention in which a lower core block piece has a curved upper surface. Referring to FIG. 41, a core block piece 101 is optically polished so that its upper surface defines a curved concave surface 101a such as a cylindrical surface or an elliptical surface which is lowest in the middle region. The formation of such curved surface 101a is readily achieved by applying the lens polishing technique. By way of example, FIG. 42 shows a core block piece 103 which may be used as a substitute for the core block piece 101, the core block piece 103 having a curved surface on its gap defining surfaces 103a, 103b and being notched otherwise.

Figure 43:
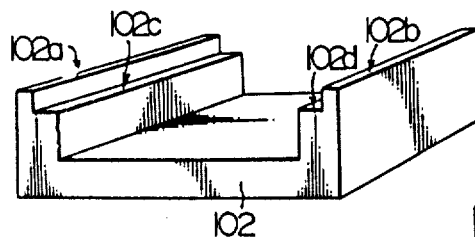

The mating core block piece 102 is shown in FIG. 43, and comprises a pair of gap defining surfaces 102a, 102b which projects along the opposite sides thereof, and a pair of notched steps 102c, 102d formed inside gap defining surfaces and serving to facilitate the placement of gap forming materials therein. However, these steps may be omitted or replaced by elongate grooves formed in the gap defining surfaces.

Figure 44:
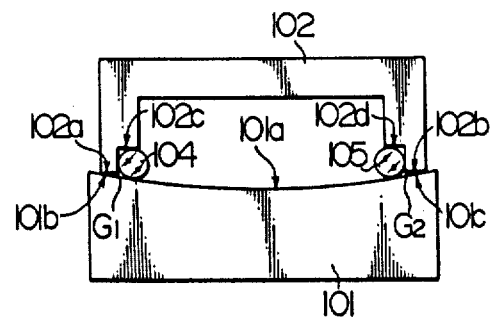
FIG. 44 is a front view of a different pair of core block pieces.
Figure 45:
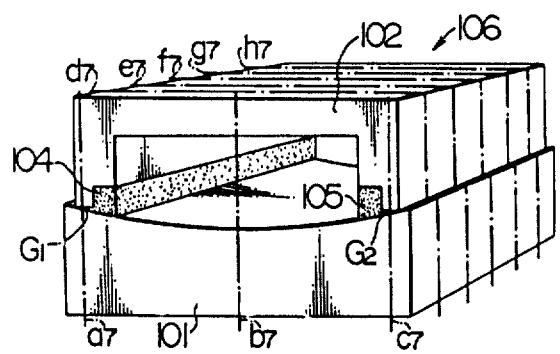
FIGS. 45 and 46 are perspective views of a finished core block and a core which is sliced therefrom, respectively.
Figure 46:
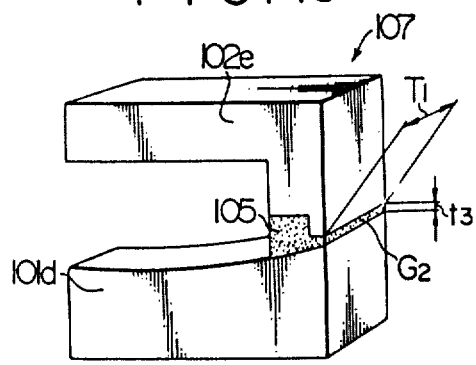

The pair of core block pieces 101, 102 are disposed in abutting relationship such that their respective gap defining surfaces are located opposite to each other, as shown in FIG. 44. A pair of round glass rods 104, 105 are disposed in the spaces defined between these gap defining surfaces, and is heated to a temperature above the softening point of the glass in a furnace chamber (not shown) filled with an inactive gas which may be similar to the arrangement shown in FIG. 4. As the assembly is heated, the glass melts to permeate into gaps $G_1$, $G_2$ defined between the mating gap defining surfaces, whereupon the assembly is allowed to cool down, thereby bonding the both core block pieces together to provide a core block 106 as shown in FIG. 45. As before, a resin molding may be applied as required.

By cutting the core block 106 along planes indicated by phantom lines $a_7$, $b_7$ and $c_7$ and slicing it along planes indicated by phantom lines $d_7$, $e_7$, $f_7$, $g_7$ and $h_7$, all of which are shown in FIG. 45, there is obtained a plurality of similar cores 107, each of which comprises a pair of core pieces 101d, 102e and includes a gap $G_2$. The gap $G_2$ has a length $t_3$ which may be adjusted to a desired value by selecting an optimum position for the respective phantom lines $a_7$, $c_7$. The track width $T_1$ can be adjusted to a desired value by suitably choosing the location of the phantom lines $d_7$ to $h_7$. It will be appreciated that when the core block 106 is not cut along the plane indicated by phantom line $b_7$, there is obtained magnetic head cores having a pair of spaced gaps.

Figure 47:
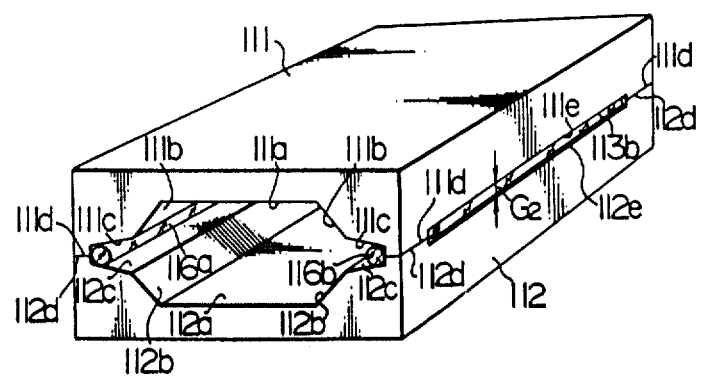
FIG. 47 is a perspective view of a pair of core block pieces, illustrating a different manner of carrying out the invention.

An additional embodiment of the invention in which a reinforcing element is used to maintain a given gap length will now be described. In the embodiment to be described below, the core comprises a sintered oxide, ferromagnetic material. Initially, there are provided a pair of core block pieces 111, 112 which are made from such material. As shown in FIG. 47, these core block pieces are channel-shaped in cross section, having a recess 111a, 112a formed centrally therein. Each of the lateral edges which define the recesses 111a, 112a is formed by a pair of contiguous, bevelled surfaces 111b, 111c or 111c, 112c which have different slopes.

The core block pieces 111, 112 have raised surfaces on the opposite sides and outside the recesses 111a, 112a. These surfaces represent magnetic path surfaces, which are optically polished so as to lie in a common plane. The magnetic path surfaces are formed with a pair of abutting surfaces 111d, 112d and a pair of gap defining surfaces 111e, 112e (only one of these gap defining surfaces being shown in FIG. 47). The magnetic path surfaces which extend lengthwise along both lateral edges of the core block pieces 111, 112 have their axial ends left to form the abutting portions 111d, 112d, which are adapted to be disposed in opposing relationship when the core block pieces 111, 112 are assembled together, while their remaining length is etched or otherwise relieved to form the gap defining surfaces 111e, 112e having a given gap length.

Subsequently, gap forming materials 113a, 113b which comprise glass rods are disposed on the gap defining surfaces 112e of the core block piece 112 (see FIG. 48), and the core block piece 111 is disposed thereon so that their recesses 111a, 112a are located opposite to each other. It should be noted that one of the gap forming materials, 113a, is not shown in FIGS. 47 and 48. Such disposition is achieved by placing the abutting portions 111d, 112d of the respective core block pieces in abutting relationship against each other. When disposed in this manner, the gap defining surfaces 111e, 112e are also disposed in opposing relationship, forming gaps $G_1$, $G_2$ of a given length therebetween. It is to be noted that one of the gaps $G_1$, is not shown in the drawings.

Figure 48:
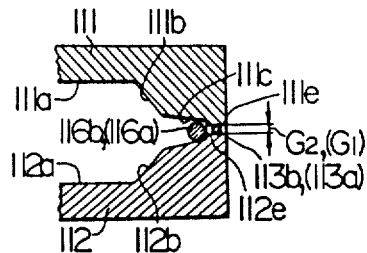
FIG. 48 is an enlarged, fragmentary elevational cross section, showing a gap portion of a pair of core block pieces.

A pair of reinforcing members 116a, 116b of a high melting point which may be formed by thin glass rods are disposed adjacent to the gaps $G_1$, $G_2$. As shown in FIG. 48, the gap forming materials 113a, 113b and the reinforcing members 116a, 116b are arranged such that one of the gap forming materials, 113b, and one of the reinforcing members, 116b, are disposed in the space defined by the upper bevelled surfaces 111c, 112c of the recesses 111a, 112a while the other gap forming material 113a and the other reinforcing member 116a are disposed in the space defined by the upper bevelled surfaces 111c, 112c of the recesses.

Figure 50:
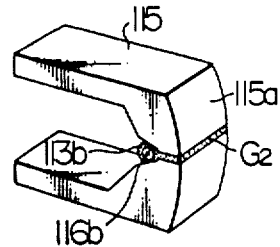
FIGS. 49 and 50 are perspective views of a finished core block and a core which is sliced therefrom, respectively.
Figure 49:
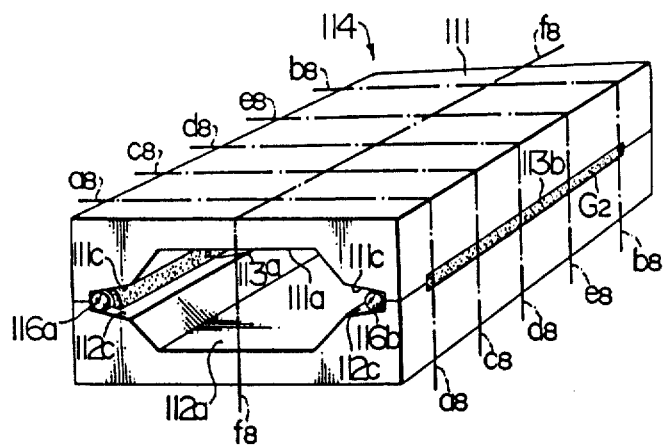

The assembly is then heated by an arrangement similar to that shown in FIG. 4. Thereupon, both gap forming materials 113a, 113b are caused to melt, flowing into gaps $G_1$, $G_2$, thus filling these gaps as well as embedding the reinforcing members 116a, 116b. In this manner, both core block pieces 111, 112 are bonded together, forming a core block 114 as shown in FIG. 49. After cooling the core block 114, it is cut and sliced as indicated by phantom lines in FIG. 49. Specifically, the core block 114 is initially cut along planes indicated by phantom lines $a_8$—$a_8$ and $b_8$—$b_8$, thus removing unnecessary portions. Then, the core block 114 is sliced along planes indicated by phantom lines $c_8$—$c_8$, $d_8$—$d_8$, $e_8$—$e_8$ so as to satisfy the size requirement. Finally, it is cut along the plane indicated by phantom lines $f_8$—$f_8$. In this manner a plurality of cores are manufactured simultaneously. By polishing a surface of the resulting core such as head surface 115a, there is provided a core 115 shown in FIG. 50 which maintains a precise length for the gap $G_2$.

While in the embodiment described above, both core block pieces 111, 112 have a similar profile, it will be appreciated that one of them may be configured in other shapes. Also, the gap forming materials and reinforcing members are not limited to thin, round rods of glass or enamel, but they may comprise glass fibre, or pellets or powder of similar material.

Figure 51:
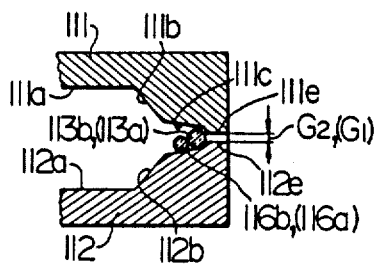
FIGS. 51 and 52 are elevational cross sections of different combinations of core block pieces.
Figure 52:
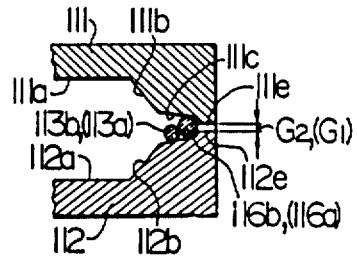
Figure 57:
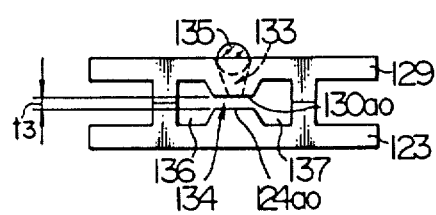
FIGS. 57 and 58 are front views of a pair of core block pieces, illustrating a series of manufacturing steps.
Figure 58:
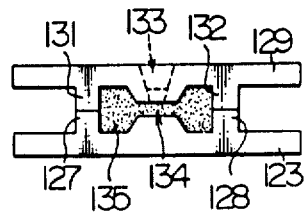

As shown in FIG. 51, the gap forming materials 113a, 113b may be disposed at a position laterally of the gaps $G_1$, $G_2$ rather than disposing them within these gaps as shown in FIG. 48. Alternatively, the reinforcing members 116a, 116b may be disposed laterally of the gaps $G_1$, $G_2$ and then the gap forming materials 113a, 113b disposed on the remote side of the reinforcing members from these gaps, as illustrated in FIG. 52.

FIGS. 53 to 61 show another embodiment of the invention in which the abutting portions of the core block pieces form the gap defining surfaces. Referring to FIG. 53, there is provided a block piece 121 having a central raised portion 122. A pair of elongate grooves 125, 126 are cut in the raised portion 122, as shown in FIG. 54, thereby forming a block piece 123a having a central projection 124, the top of which is formed as a magnetic path surface 124a, and also having a pair of lateral projections 127, 128, the tops of which respectively form abutting portions 127a, 128a. The magnetic path surface 124a, and the abutting surfaces 127a, 128a are optically polished and etched as required to produce a core block piece 123 (see FIG. 55) which has a gap defining surface 124aO of a given height and abutting surfaces 127a, 128a. The grooves 125, 126 serve to maintain the desired gap length.

A mating core block piece 129 is similarly formed to have a gap defining surface 130aO and a pair of abutting surfaces 131a, 132a. When machining a projection 130 having the gap defining surface, and a pair of lateral projections 131, 132 on which the abutting surfaces 131a, 132a are located, an elongate, tapered slot 133 is formed so as to extend through the central projection 130, with the slot 133 being tapered toward the gap defining surface 130aO.

Then the core block piece 129 is disposed in abutting relationship with the core block piece 123 so that the abutting surfaces 131a, 132a bear against the abutting surfaces 127a, 128a, as shown in FIG. 56. When disposed in this manner, there is formed a gap 134 having a precise length $t_3$ (see FIGS. 57 and 58).

A gap forming material 135 which may be in the form of a thin, round rod or chips of glass or enamel, is disposed in the opening of the slot 133. Subsequently, the gap forming material 135 is heated to melt, by an arrangement as illustrated in FIG. 4, whereby it flows into the gap 134 to fill the gap as well as a pair of reinforcing spaces 136, 137 which are formed between the core block pieces 123, 129. When the assembly is cooled down, core block pieces 123, 129 are bonded together.

Figure 59:
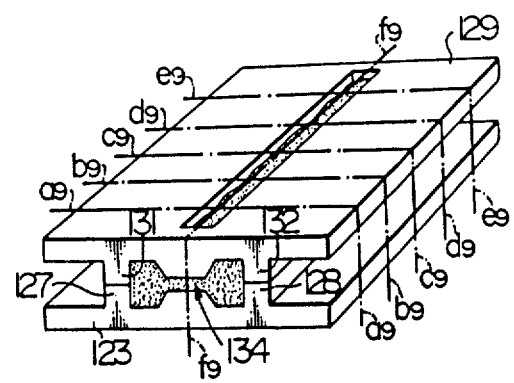
FIGS. 59 and 60 are perspective views of a different pair of core block pieces.

As shown in FIG. 59, the resulting core block is sliced along planes indicated by phantom lines $a_9$—$a_9$, $b_9$—$b_9$, $c_9$—$c_9$, $d_9$—$d_9$, $e_9$—$e_9$, and so on, and is also cut along a plane indicated by a phantom line $f_9$—$f_9$. In this manner, a plurality of cores are simultaneously obtained. By polishing a necessary surface of the core, such as the head surface thereof which is adapted for contact with the magnetic tape, for example, there is obtained a core for use in a magnetic head which has the gap 134 of a precise length $t_3$.

Figure 60:
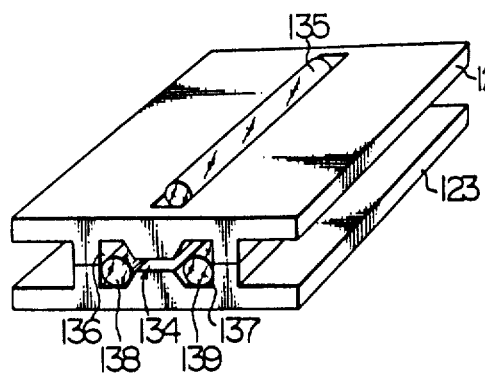
Figure 61:
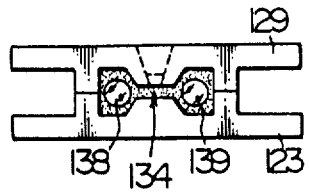
FIG. 61 is a front view, partly in section, illustrating one manufacturing step in the method of the invention.

FIG. 60 shows the disposition within the reinforcing spaces 136, 137 of supplementary members 138, 139 such as glass or enamel rods having a higher melting point than that of the gap forming material 135. With this arrangement, as the gap forming material 135 melts and flows into the spaces 136, 137 and is solidified therein, it secures these members 138, 139 together with the core block pieces 123, 129, thus providing a rigid core block, as shown in FIG. 61 In addition, this advantageously assists in filling the spaces 136, 137 rapidly.

Figure 62:
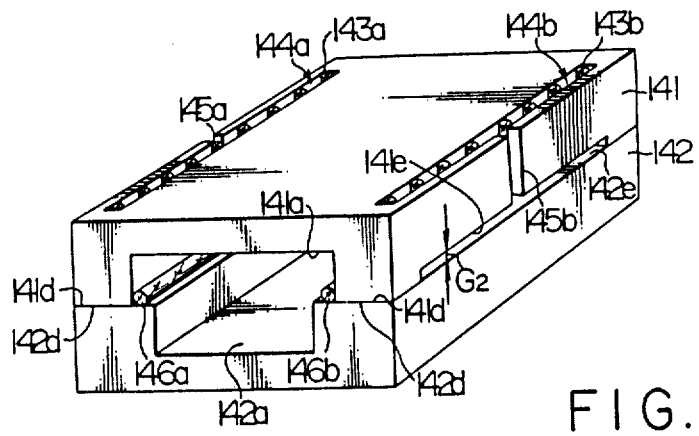
FIG. 62 is a perspective view of a different pair of core block pieces.
Figure 63:
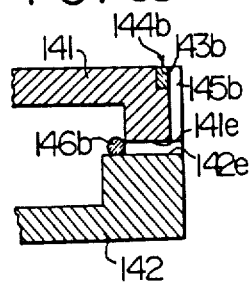
FIG. 63 is a fragmentary cross section of still another pair of core block pieces.
Figure 64:
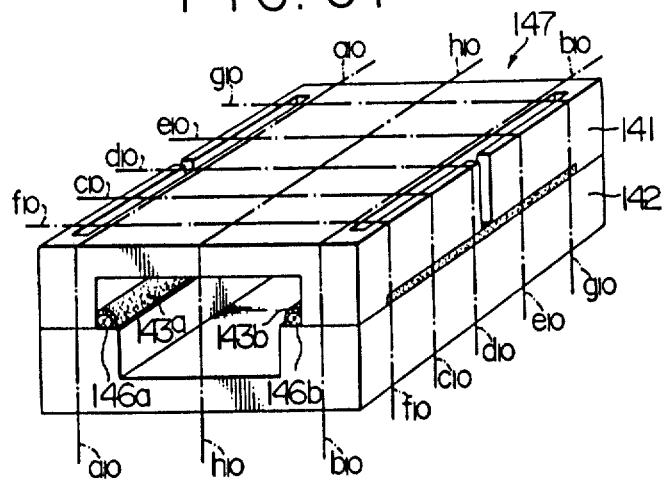
FIG. 64 is a perspective view of a finished core block.

FIGS. 62 to 64 show an additional embodiment of the invention which utilizes reinforcing members. Referring to FIG. 62, there is provided a pair of core block pieces 141, 142 which are channel-shaped in cross section, each having a central recess 141a, 142a. The pieces 141, 142 each have raised surfaces on the opposite sides of the recesses 141a, 142a, which form magnetic path surfaces. These magnetic path surfaces are optically polished so as to lie in a common plane. At their opposite ends, the respective magnetic path surfaces are formed with abutting portions 141d, 142d, respectively, and one of the core block pieces 141, is also formed with a gap defining surface 141e in the form of a shallow recess. Such gap defining surface may be formed by etching or otherwise relieving techniques. The magnetic path surfaces of the piece 142 are provided with a gap defining surface 142e at a position opposite to the gap defining surface 141e of the piece 141. Before forming the abutting portions 141d and the gap defining surfaces 141e, the core block piece 141 is formed with a pair of lengthwise extending grooves 144a, 144b in its upper surface which are adapted to receive gap forming materials 143a, 143b, and a pair of notches 145a, 145b are formed so as to communicate these grooves with the gap defining surfaces. 141e.

The core block pieces 141, 142 are disposed in abutting relationship in a manner such that their recesses 141a, 142a face each other. This can be achieved by placing these core block pieces so that their abutting portions 141d, 142d bear against each other, as shown in FIG. 62. A gap $G_2$ of a given length is defined by the oppositely located gap defining surfaces 141e, 142e of the core block pieces. Gap forming materials 143a, 143b which may comprise a plurality of thin glass rods are then disposed in the grooves 144a, 144b formed in the core block piece 141, and a pair of reinforcing members 146a, 146b in the form of thin glass rods having a higher melting point than that of the gap forming materials 143a, 143b are disposed adjacent to the gap $G_2$.

When the assembly is heated in the manner mentioned above, the gap forming materials 143a, 143b melt to flow into the gap $G_2$ through the notches 145a, 145b, thus filling the gap $G_2$ and embedding the reinforcing members 146a, 146b therein. In this manner, the core block pieces 141, 142 are bonded together to form a core block 147 as shown in FIG. 64. After cooling down the core block 147, it is cut along planes indicated by phantom lines $a_{10}$—$a_{10}$, $b_{10}$—$b_{10}$, $f_{10}$—$f_{10}$ and $g_{10}$—$g_{10}$ shown in FIg. 64, removing unnecessary portions. Then the core block is sliced along planes indicated by phantom lines $c_{10}$—$c_{10}$, $d_{10}$—$d_{10}$ and $e_{10}$—$e_{10}$ so as to achieve a desired gap or track width. After polishing the surface of the core which forms the head surface adapted to contact a magnetic tape, the resulting core is incorporated into a magnetic head. In this manner, a multitude of the cores having an accurate gap length can be produced simultaneously.

It is to be noted that one of the core block pieces 141, 142 may have a different configuration from that shown. In addition, thin, round rods of glass or enamel used in the above embodiment as the gap forming materials and the reinforcing members may be replaced by any other suitable material such as glass fibre, pellets or powder of the same or similar material.

We claim:

1. A method of manufacturing magnetic heads comprising the steps of providing a first core block piece having a pair of gap defining surfaces adjacent to its opposite sides, the gap defining surfaces being parallel to each other and projecting to different elevations, providing a second core block piece having a pair of gap defining surfaces which correspond to the gap defining surfaces of the first core block piece, disposing the first and second core block pieces in abutting relationship so that the associated gap defining surfaces are located opposite to each other, the differential elevations of the gap defining surfaces of the first core block piece causing the first core block piece to assume an inclined position, causing a molten gap forming material to permeate into a wedge-shaped clearance region formed between the gap defining surfaces, causing the gap forming material to solidify to provide a core block, and thereafter dividing the core block into a plurality of cores each having a predetermined size.

2. A method of manufacturing magnetic heads comprising the steps of providing a pair of cylindrical core block pieces each having a gap defining surface on its surface which faces the other core block piece, at least one of the gap defining surfaces being a gently bevelled surface, disposing the core block pieces in abutting relationship so that a small gap is formed between the gap defining surfaces, disposing a non-magnetic body laterally of the gap, heating the non-magnetic body to melt for permeation into and filling the gap, allowing the assembly to cool down for solidification, thereby providing a cylindrical core block which comprises the pair of core block pieces bonded together, cutting the core block along a plurality of planes which includes the central axis of the cylinder, finishing the resulting plurality of cores into a desired configuration, thereby producing cores adapted for use as a magnetic head.

3. A method of manufacturing magnetic heads according to claim 2 in which the pair of cylindrical core block pieces have the same diameter.

4. A method of manufacturing magnetic heads according to claim 2 in which the pair of cylindrical core block pieces have different diameters.

5. A method of manufacturing magnetic heads according to claim 2 in which the gap defining surface of at least one of the cylindrical core block pieces is partly formed with a circular groove which is concentric with the axis of the cylinder.

6. A method of manufacturing magnetic heads comprising the steps of providing a pair of lower core block pieces, each of the lower core block pieces having an edge, disposing the lower core block pieces in adjoining relationship along their said edges, the pair of core block pieces being formed to be symmetrical with respect to the adjoining edge and each having a bevelled gap defining surface which is at a higher elevation at the edge remote from the adjoining edge, providing a separate core block piece having a gap defining surfaces which are symmetrically located and formed, disposing said separate core block piece on top of the pair of lower core block pieces in a symmetrical manner with respect to the adjoining edge so that the gap defining surfaces of the separate core block piece are located opposite to the gap defining surfaces of the pair of lower core block pieces, causing a molten gap defining material to permeate into the spaces defined between the gap defining surfaces, thereby providing a core block, and thereafter dividing the core block into a plurality of cores each having a predetermined size.

7. A method of manufacturing magnetic heads according to claim 6 in which the pair of lower core block pieces each comprise a rectangular block disposed in juxtaposition to each other and provided with a foot member on their bottoms at locations which are remote from the adjoining edge, thereby causing their upper surfaces to be inclined with respect to the horizontal.

8. A method of manufacturing magnetic heads comprising the steps of; providing a pair of core block pieces each including a flat body portion, a gap defining surface which projects from the body portion, and an abutting portion which projects from the flat body portion to an elevation which is slightly higher than the gap defining surfaces; disposing the both core block pieces in abutting relationship so that the abutting portions bear against each other and the gap defining surfaces are located opposite to each other, whereby one of the core pieces defines an upper core block piece and the other of the core block pieces defines a lower core block piece; the gap defining surface of the upper core block piece being formed with an elongate slot which extends through the core block piece for passage of a gap forming material therethrough; placing the gap forming material at a location above the elongate slot; heating the gap forming material to cause it to melt, whereby the molten gap forming material flowing through the elongate slot into the space formed between the gap defining surfaces of the upper and lower core block pieces to fill such space; allowing the assembly to cool down to provide a core block; and thereafter dividing the core block into a pluralty of cores each having a predetermined size.

9. A method of manufacturing magnetic heads according to claim 8 in which the both core block pieces are formed with spaces laterally of the gap defining surface in which a reinforcing material having a higher melting point than that of the gap forming material is disposed.

10. A method of manufacturing magnetic heads comprising the steps of providing a pair of core block pieces each having a pair of gap defining surfaces adjacent to the opposite sides thereof, at least one of the core block pieces being formed with a groove for placement of a gap forming material therein, said one core block piece being provided with a notch which provides a communication between the groove and the gap defining surfaces thereof, disposing said one core block piece on top of the other core block piece in abutting relationship therewith, placing a high melting reinforcing material adjacent to both gap defining surfaces, placing a low melting gap forming material in the groove, heating the gap forming material to cause it to melt, thereby causing the molten gap forming material to flow into the space between the gap defining surfaces through the notch to permit the space between the gap defining surfaces and the reinforcing material to be filled and embedded with the gap forming material, thereafter cooling the assembly to solidify the gap forming material to thereby provide a core block, dividing the core block into a plurality of cores each having a predetermined size, and polishing a required surface of the respective cores.

* * * * *